United States Patent [19]
Kim

[11] Patent Number: 5,835,239
[45] Date of Patent: Nov. 10, 1998

[54] FACSIMILE APPARATUS HAVING ACCESS FUNCTION TO A PLURALITY OF TELEPHONE LINES AND ACCESS METHOD

[75] Inventor: Eog-Kyu Kim, Goomi, Rep. of Korea

[73] Assignee: SamSung Electronics Co., Ltd., Suwon, Rep. of Korea

[21] Appl. No.: 585,635

[22] Filed: Jan. 16, 1996

[30] Foreign Application Priority Data

Jan. 16, 1995 [KR] Rep. of Korea ...................... 642-1995

[51] Int. Cl.⁶ ............................ H04M 11/00; H04N 1/32
[52] U.S. Cl. ................ 358/468; 379/100.01; 379/100.15
[58] Field of Search ..................................... 379/100, 375, 379/88, 89, 53, 54, 60, 63, 65, 81, 82; 358/442, 400, 405, 407, 434, 435, 436, 437, 439, 468

[56] References Cited

U.S. PATENT DOCUMENTS

| | | | |
|---|---|---|---|
| 4,991,200 | 2/1991 | Lin ........................................ | 379/100 |
| 5,131,026 | 7/1992 | Park ...................................... | 379/100 |
| 5,333,190 | 7/1994 | Eyster ................................... | 379/375 |
| 5,369,688 | 11/1994 | Tsukamoto ............................. | 379/100 |
| 5,499,287 | 3/1996 | Campbell et al. ..................... | 379/100 |
| 5,530,558 | 6/1996 | Nachman .............................. | 358/442 |
| 5,546,451 | 8/1996 | Shen ...................................... | 379/97 |
| 5,563,938 | 10/1996 | Soshea et al. ......................... | 379/201 |

Primary Examiner—Thomas D. Lee
Assistant Examiner—Jerome Grant, II
Attorney, Agent, or Firm—Robert E. Bushnell, Esq.

[57] ABSTRACT

A telecommunication facsimile set accommodating transmission and reception of facsimile data during a telephone conversation on a telephone handset built into a facsimile machine, and placement of an established connection between the telephone handset built into the facsimile telecommunication set to put the connection on hold in order to talk with another caller via a second telephone line. The facsimile telecommunications set may be constructed with a microprocessor controller sensing both telephone signals and user activated signals, and sending control signals which activate circuit switching relays causing either the facsimile telephone handset or the facsimile modem to connect to either of the two telephone lines.

9 Claims, 4 Drawing Sheets

FACSIMILE APPARATUS HAVING ACCESS FUNCTION TO A PLURALITY OF TELEPHONE LINES AND ACCESS METHOD

CROSS-REFERENCE TO RELATED APPLICATIONS

This application makes reference to, incorporates the same herein, and claims all benefits accruing under 35 U.S.C. §119 arising from an application for FACSIMILE APPARATUS HAVING ACCESS FUNCTION TO A PLURALITY OF TELEPHONES LINES AND ACCESS METHOD earlier filed in the Korean Industrial Property Office on 16 Jan., 1995 and there duly assigned Serial No. 642/1995.

BACKGROUND OF THE INVENTION

The present invention relates to voice and data telecommunication apparatus and processes, and more particularly, to processes and facsimile telecommunication sets providing access to a plurality of effectively operable telephone lines.

Generally, a facsimile telecommunication set has one function of transmitting documents to other people through a telephone line and receiving facsimile reproduction of documents through the telephone line from the other people and to print the received document onto a medium such as paper, and at the same time, has another function of enabling oral voice communications because the facsimile apparatus interlocks with a telephone handset.

In contemporary facsimile telecommunication sets, while transmitting or receiving documents through one telephone line connected in accordance with contemporary circuit designs, it is difficult to call other people on the telephone handset. Moreover, while participating in a telephone call via the handset, it is difficult to achieve the transmission or reception of a document through the facsimile set. That is, with contemporary facsimile telecommunication sets having an integrated telephone handset, only one operation can be performed when only one line is used, and at the same time another operation can not be performed. Therefore, an ordinary facsimile user installs in his, or her, office or home a general telephone deskset connected to a different telephone line in addition to the internal or external telephone handset of the facsimile apparatus because the user knows of these limitations on the availability of these functions. In this case, the facsimile set and the facsimile telephone handset are only used for transmitting or receiving of data representing images of the document and the general telephone deskset is only used for voice communication.

I have discovered that a problem occurs when it becomes impossible to transmit or receive image data in the facsimile apparatus during use of the facsimile telephone handset for voice communications. Moreover, I have also found that it is difficult to intercept incoming calls on the other telephone when one telephone set is busy because the two telephone lines are separately connected to their assigned telephone lines and perform their respective operations independently.

The notion of being able to answer a ringing telephone set from another telephone set, noted, by way of example, in U.S. Pat. No. 2,168,893 to Peterson for SECRETARIAL ANSWERING SYSTEM, as frequently implemented in contemporary circuit designs, requires a secretarial answering system that relies upon relay switching circuitry and additional office personnel to manually perform a call pick-up function connect one telephone set to any one of the plurality of telephone lines. U.S. Pat. No. 2,847,512 to Crabtree for SECRETARIAL ANSWERING SYSTEM suggests a secretarial answering service enabling access to a plurality of telephone lines by using switching relays to couple a resistor between the leads of one telephone line to prevent disconnection of the call.

Previous efforts to provide two telephone lines to a single establishment are exemplified by U.S. Pat. No. 5,056,133 to Iida for DATA COMMUNICATION APPARATUS COUPLED TO TWO TELEPHONE LINES, which contemplates communication apparatus containing two telephone lines originating from a central office, one facsimile machine, and one telephone set built into a facsimile machine. Iida '133 allows the user to select a line for a telephone conversation or transfer of facsimile data. Iida '133 allows for the simultaneous use of the facsimile machine and the telephone set built into the facsimile machine. Iida '133 does not contemplate more than one telephone set and therefore is restricted to use of only a single telephone circuit.

U.S. Pat. No. 4,825,461 issued to Kurita for DATA COMMUNICATION APPARATUS FOR DATA AND/OR SPEECH COMMUNICATION ON A PLURALITY OF COMMUNICATION LINES uses two telephone lines originating from a central office, one facsimile machine with a modem for transmitting and receiving data, and two telephone sets, one being a telephone handset built into the facsimile machine. Embodiments of Kurita '461 accommodate voice conversation in progress on the telephone set that is built into the modem. When during a voice conversation it is desired to simultaneously either transmit or receive data to or from the same facsimile machine from which the voice conversation is taking place, Kurita '461 endeavors to control switching circuit relays to connect the second telephone line to the facsimile modem so that data can be transmitted or received over the second telephone line while the voice conversation continues over the first telephone line. I have found that Kurita '461 provides a less than efficient use of the two telephone line pairs required to implement those embodiments.

A more recent effort, described in Ikeguchi, U.S. Pat. No. 5,481,373 for FACSIMILE APPARATUS AND TELEPHONE TERMINAL APPARATUS HAVING VOICE AND IMAGE COMMUNICATION FUNCTIONS, during reception of a facsimile reception, contemplates enabling the user of the facsimile set to conduct voice communications via a telephone handset integrated into the facsimile set by manually entering a code through the keypad of the facsimile set. The code causes a controller to switch the telephone line to the handset to enable voice communications, albeit at a cost of interrupting the facsimile transmission of document data.

SUMMARY OF THE INVENTION

It is therefore, an object of the present invention to provide an improved telecommunication process and apparatus.

It is another object to provide a facsimile telecommunications set accommodating use of a telephone handset incorporated into the set while concurrently receiving or transmitting image data via the facsimile set.

It is another object to provide a facsimile telecommunications set having access to a telephone line to a plurality of effectively operable telephone lines.

It is still another object to provide a process enabling access when a telephone handset incorporated into a facsimile telecommunications set and a discrete telephone handset are each connected to the facsimile telecommunications set.

It is yet another object to provide a process for transmitting and receiving image data in a facsimile telecommunications set while a telephone handset incorporated into the facsimile telecommunications set is in use.

These and other objects may be achieved by checking whether or not facsimile data is to be transmitted or received while a telephone handset incorporated into the facsimile telecommunications set is busy. In case that data is to be transmitted, a determination is made of whether or not a second code of a dual tone form indicating a transmission of data, is being received through a telephone deskset and, upon reception of the second code, a second telephone line is coupled to a modem of the facsimile set under control of relays; and transmission of protocol data and normal facsimile document data are routed through the second telephone line. Upon reception of the protocol data, a determination is made of whether a first code of a dual tone form indicating the reception of the protocol data, has been received through the telephone deskset, and upon reception of the first code, the second telephone line is coupled to a modem of the facsimile set under control of the relays; and transmission of protocol data and normal facsimile document data is routed through the second telephone line.

In order to further achieve these objects, when the facsimile telephone handset is busy, a determination is made of whether or not a third code of a dual tone form indicating a call intercept, is received by the controller. Upon reception of the third code, the first telephone line is put "on hold" under control of a relay element, and the second telephone line is coupled to the telephone handset of the facsimile apparatus. In response to a reception of a fourth code from the facsimile telephone handset, the second telephone line is disconnected and the first telephone line is recoupled from an "on hold" on state to the facsimile telephone handset to allow the conversation the first telephone line to resume.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, the specific details for configuration are set forth to provide a more thorough understanding of the present invention. It will be apparent, however, to one skilled in the art, that the present invention may be practiced without these specific details. In other instances, well known features have not been described in detail so as not to obscure the present invention.

Figure 1:
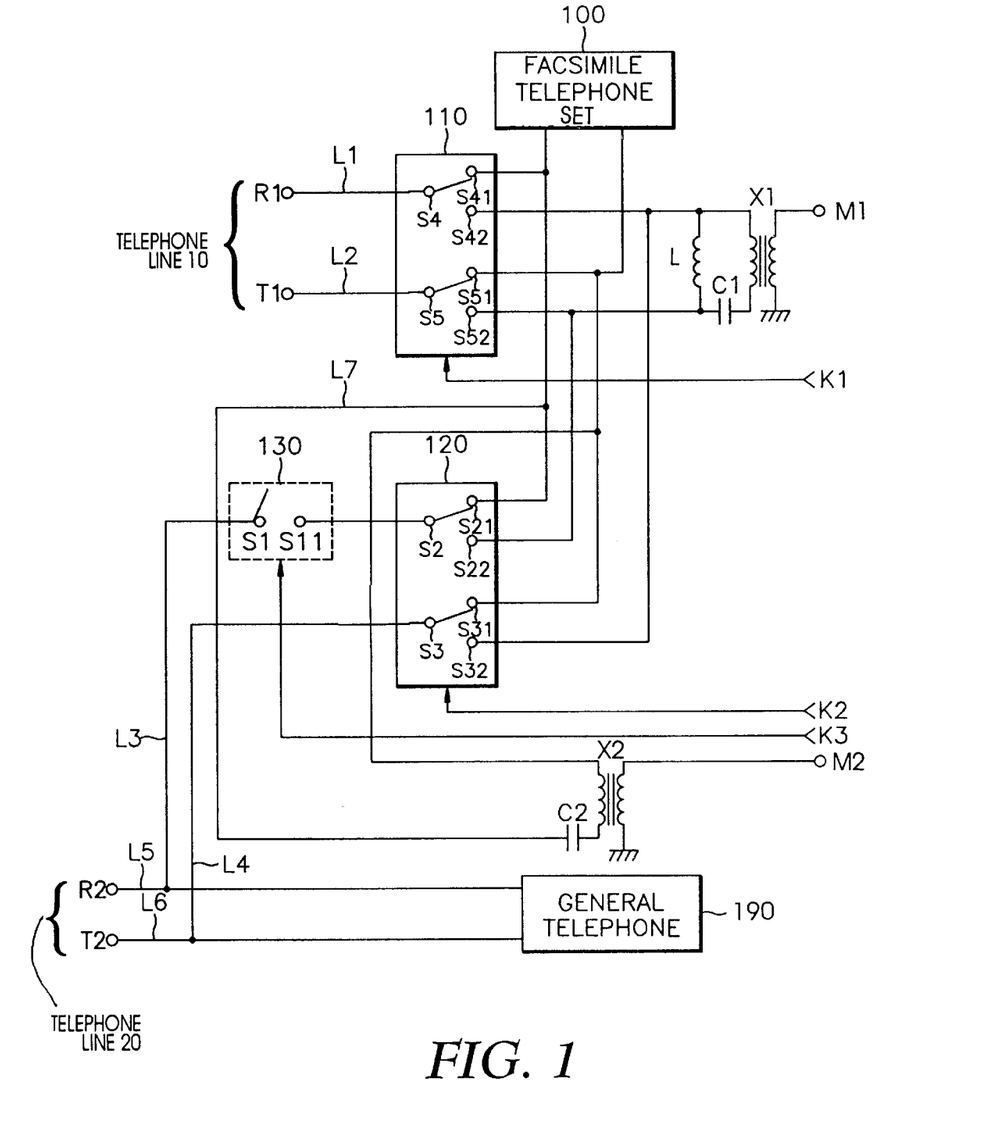
FIG. 1 is a circuit diagram of the switching circuit relays which allow for either of the two telephone sets or the modem to be connected to either of the two telephone lines.

FIG. 1 shows a relay connection configuration able to connect either of one facsimile machine and two telephone handsets to either of two telephone lines 10, 20 originating from a central office (not shown). Ring line R1 and tip line T1 of a first telephone line 10 are connected to switching contact wipers S4 and S5 of relay 110 by way of leads L1 and L2, respectively. In response to a first control signal K1, relay 110 switches the line coupling state of contact wipers S4 and S5 to connect leads L1, L2 for the first telephone line 10 to either a modem 240 (shown in FIG. 2) of a facsimile telecommunication set or to telephone handset 100 electrically incorporated into the facsimile set. A second relay 120 directs ring line R2 and tip line T2 of a second telephone line 20 toward switching contact wipers S2 and S3 respectively. In response to a second control signal K2, second relay 120 switches contact wipers S2 and S3 of relay 120 to electrically connect the second telephone line to either the facsimile modem or to the circuit for the facsimile telephone handset 100. A third relay 130 is situated between one of the second telephone lines (here, ring line R2) and contact wiper S2 of second relay 120. Responding to third control signal K3, contact wiper S1 opens or closes to either disconnect or connect ring line R2 from, or to, relay 120. The first and second matching transformers X1 and X2 for the first and second matches are connected to the modem of the facsimile apparatus. An inductance L is coupled across the primary winding of a first transformer X1, and capacitors C1 to and C2 are serially coupled between the respective primary windings of the first and second transformers X1, X2, for suppression of electrical surges. Leads L5 and L6 connect ring line R2 and tip line T2 of the second telephone line 20 to the second (or general) telephone hand set 190. Line L5 is connected by line L3 to third relay 130. Lead L6 is connected to second relay 120 via lead L4. Lead L3 can be connected to one of the lines of the facsimile telephone hand set 100 if contact wiper S1 is closed and contact wiper S2 is in contact with contact S21. Depending upon the states of the control signals K1, K2, and K3, each of the two telephone sets, and the facsimile modem can be connected to either of the two telephone lines 10 and 20.

Figure 2:
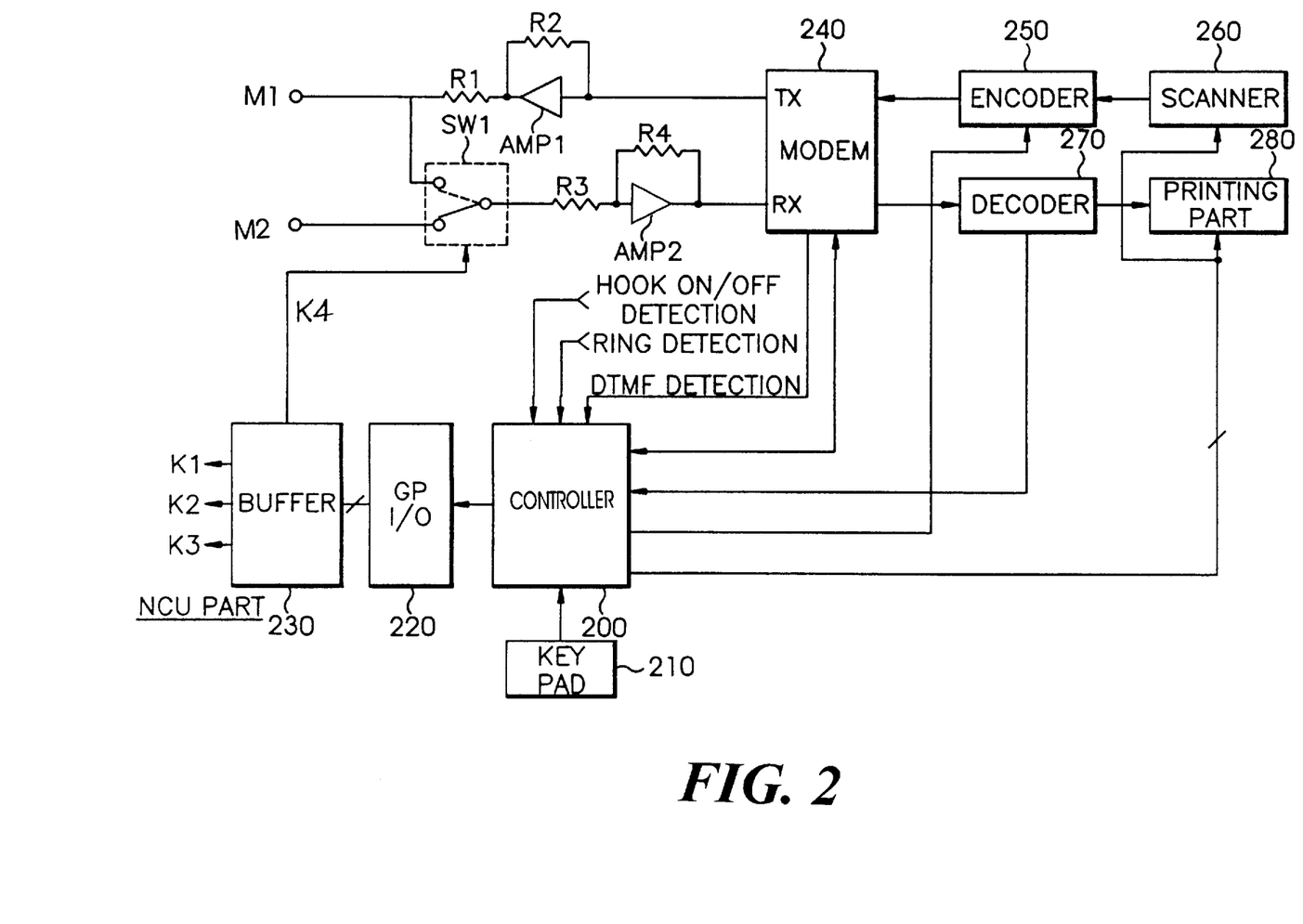
FIG. 2 is a block diagram of the facsimile apparatus applied to the present invention, showing the keypad and the control part.

FIG. 2 is a block diagram of a facsimile telecommunication set constructed according to the principles of the present invention. When the first telephone line of leads L1 and L2 are connected to the modem 240 of the facsimile set, amplifiers AMP1 and AMP2 for transmission and reception are connected to the input ports of modem 240. In order to operate amplifier AMP1 for transmission, resistance R5 is coupled in series between the output port of amplifier AMP1 and feedback resistance R2 is coupled across one input port and the output port of amplifier AMP1. In order to operate amplifier AMP2 for reception, resistance R3 is coupled in series between an input port of amplifier AMP2 and the pole of switch SWI, while a feedback resistance R4 is coupled across one input port and the input port of amplifier AMP2. A first switch SW1 is connected to couple the output port of amplifier AMP2 via resistor R3 to either of the output node M1 of transformer X1 or the output node M2 of transformer X2. The function and operation of the modem 240 are well known in this art.

An encoder 250 is connected to an input terminal of modem 240 and a scanner 260 reads the image data from a document and then provides a binary signal corresponding to the image data to encoder 250. Encoder 250 and scanner 260 are operated under control of a controller 200, such as a microprocessor. Decoder 270 is connected to an output terminal of modem 240 and document printer 280 prints the image data received in order to create on a printable medium such as a cut sheet of paper, a facsimile of a document corresponding to the image data. Decoder 270 and printer 280 are also operated under control of controller 200.

Controller 200 has a read only memory (ROM) and a random access memory (RAM) (not shown), and accesses a control program previously set in the ROM memory to control all the operations of the facsimile set. Controller 200 performs operations determined in each of the steps illustrated by FIGS. 3 and 4 in accordance with the principles of the present invention. A key pad 210 is an input element provided to apply an user's manual command to controller 200. Controller 200 is connected to modem 240 so that controller 200 receives the data received by modem 240 as a dual tone waveform signal, and then provides a specific control signal to a general purpose input/output stage 220. In addition, controller 200 senses hook-on states and hook-off states of telephone handset 100 through a hook off detector, and also senses the ring detection states of both the first and second telephone lines through a ring detector. Controller 200 applies the specific control signal to input/output stage 220 during the performance of the operational steps illustrated in FIGS. 3 and 4, and, in turn, input/output stage 220 sends control signals to buffer 230 which provides control signals K1, K2, K3 and K4 to operate relays 110, 120, and 130 and switch SW1, respectively. In general, buffer 230 is included in the facsimile telecommunication set as a net control unit (NCU).

Figure 3:
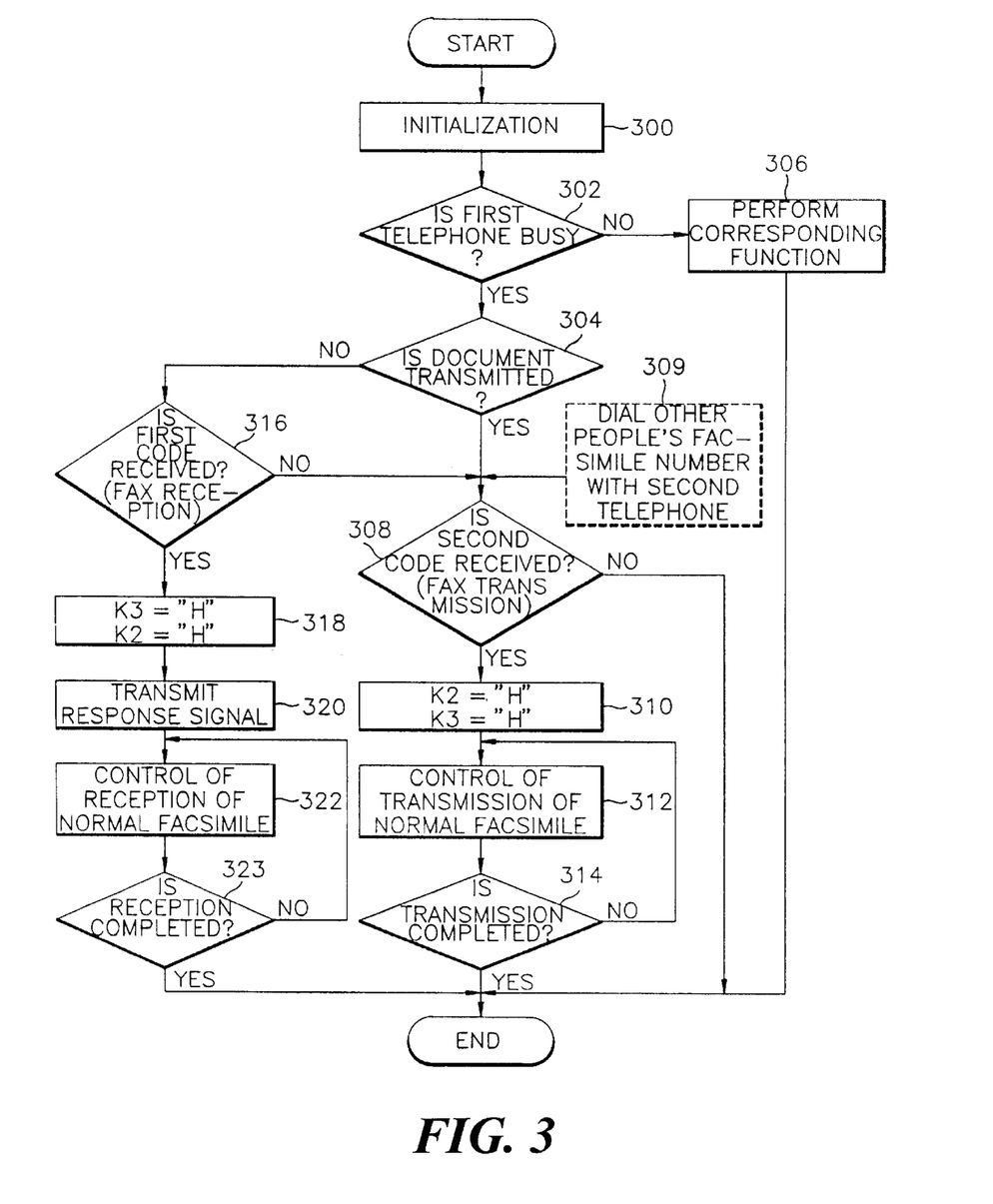
FIG. 3 is a flow chart illustrating control of the reception of facsimile date received through a telephone deskset over a second telephone line in accordance with the principles of the present invention.

Referring now to FIG. 3, a flow chart illustrates control of reception and transmission of facsimile data over telephone line 20 in conjunction with the practice of the present invention. In steps 300 to 323, a method is shown for transmitting and receiving facsimile image data to and from the facsimile set connected between the first and second telephone lines 10 and 20 respectively. Using relays 110 and 120 respectively. In step 300, controller 200 initializes the facsimile set, and in response to key data applied through key pad 210, the controller. Where telephone handset 100 is being using used by monitoring the hook-off detection signal for telephone handset 100 performs a corresponding operation. In step 302, controller 200 checks whether telephone handset 100 is being used by monitoring the hook-off detection signal for telephone handset 100. In the meantime, the operations through steps 304 to 323 are performed when the first telephone, i.e., the facsimile telephone handset 100 is being used to converse over telephone line 10. If in step 302 the facsimile telephone handset 100 is found to be in use (i.e., in an off-hook state), controller 200 checks in step 304 whether or not facsimile data is to be simultaneous transmitted or received.

In case of transmitting data in step 304, a second code of a dual tone form indicating that data is to be transmitted over second telephone line 20 is checked in step 308. If the second code is received, controller 200 proceeds to step 310 and then provides the second and third control signals K2, K3, respectively to the second relay 120 and the third relay 130. Therefore, second telephone line 20 is coupled to the modem 240 of the facsimile set. In step 312, the protocol of the transmission of the normal facsimile data and the data transmission are controlled through second telephone line 20. In step 314, controller 200 checks whether the transmission for the data of the document is completed or not. If the operation is completed, controller 200 ends its operation. The operation of step 309 being between steps 304 and 308 is not executed by controller 200; however, performance of step 309 is achieved when the user dials another subscriber's facsimile number with the second telephone, i.e., by using general telephone deskset 190.

In step 306, a function corresponding to a time the first telephone is set 100 is being used, is performed. The second code is a signal of the dual tone form, generated through a MFC telephone. The second code can be generated by a specific function key or with manipulation of several numeral keys. In the meantime, it may be desired that the second code is printed in a product manual. This results in enabling the user to freely control the operational performance of the sets.

Meanwhile, in case of the reception of the data in the process of FIG. 3, the operations through steps 316 to 323 are performed. In step 316, controller 200 checks for reception of a first code of the dual tone form indicating that the data is to be received through the second telephone line 20 of leads L5 and L6. Thus, if the first code is received, the controller 200 proceeds to step 318 so that controller 200 controls the relays 120 and 130 and couples the second telephone line 20 to the modem 240 of the facsimile set. In step 318 the second and third control signals K2, K3 are applied at the logic "high" level, so that relays 120 and 130 are switched. In step 320 a response signal is transmitted and in step 322 a reception operation for the facsimile set is controlled. Thereby, the protocol for normal facsimile reception of the document image data are achieved by using the second telephone line 20. Therefore, it is possible to transmit and receive facsimile data through the second telephone line 20 when the first telephone line 10 is busy, because of the use of telephone handset 100 for a.

Figure 4:
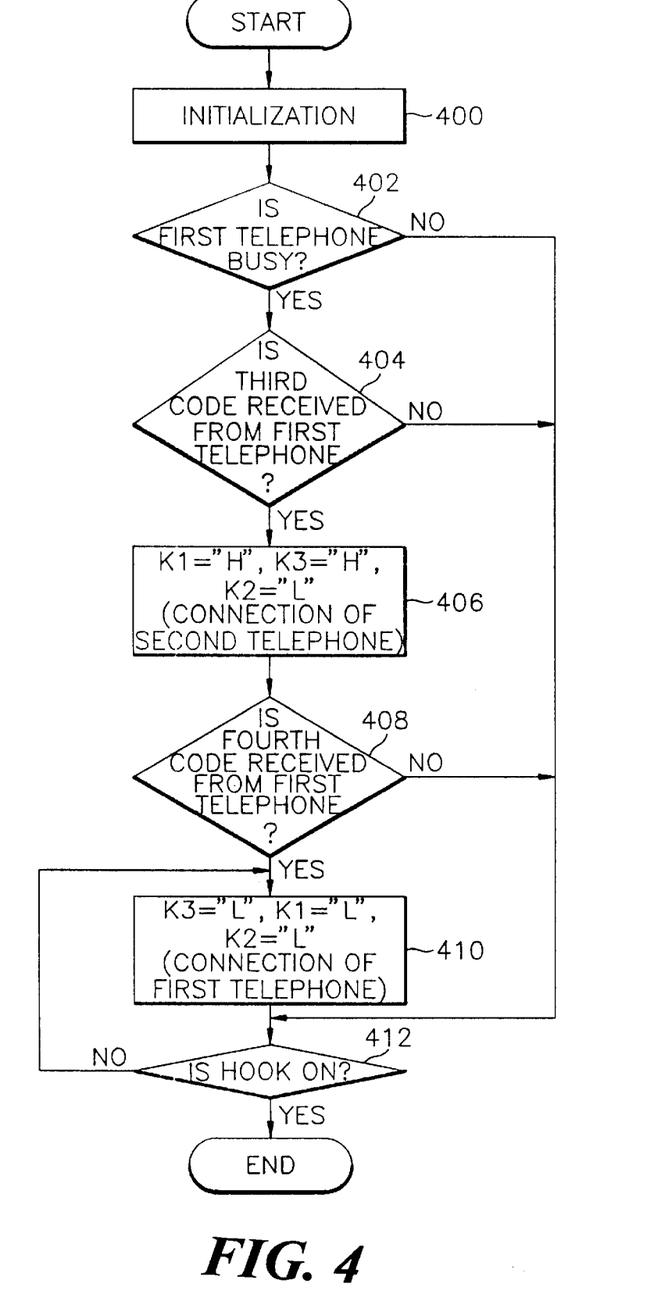
FIG. 4 is a flow chart illustrating control of an intercept call performed in accordance with the principles of the present invention.

FIG. 4 is a flow chart illustrating control of an intercept call according to the practice of the present invention. The call intercept function performed by the facsimile apparatus connected between the first telephone line 10 and second telephone line 20 through relays 110 and 120, is shown through steps 400 to 412. In step 400, an initialization operation is performed. In step 402, controller 200 checks whether the facsimile telephone handset 100 is being used or not. If the facsimile telephone handset 100 is being used during step 404, handset 100 is checked to determine whether or not a third code of the dual tone form indicates that a call intercept has been received by controller 200. If the third code is received, in step 404 controller 200 applies the first control signal K1 and the third control signal K3 to first relay 110 and third relay 130 respectively with logic "high" levels, and also applies second control signal K2 to second relay 120 with a logic "low" level. These logic states place the first telephone line 10 on hold, and couple the second telephone line 20 to the telephone handset 100 of the facsimile set, thereby providing the user on telephone handset 100 access to telephone line 20. After the user makes an intercept call, if the user wants to resume with the call placed on hold, the user must press a preset fourth code. In step 408, it is checked from the facsimile telephone set 100 whether or not the fourth code is received. When the fourth code is received, controller 200 disconnects the second telephone line 20 from facsimile telephone hand set 100 and re-couples the first telephone line 10 to facsimile telephone handset 100 This is accomplished by having controller 200 in step 410 the logic "low" level. During re-connection of the first telephone, line 10 to facsimile telephone handset 100 controller 200 proceeds to step 412, and its operation is completed during a hook-on condition of facsimile telephone handset 100.

As described above, the present invention has the access function to a plurality of effectively operable telephone lines by connecting the facsimile telephone and the general telephone to one facsimile apparatus. Thereby, there are provided two kinds of efficiency in the present invention. The first efficiency is to transmit and receive the facsimile data even if the facsimile telephone is busy. And, the second efficiency is to intercept other telephone when any one telephone is busy (i.e., is in an off-hook state).

In the meantime, although only the preferred embodiment of the present invention is described therein, various modifications can be implemented within the spirit and the scope of the present invention. For example, it is well known that it is possible to generate the first to fourth codes by an expedient of manual manipulation of corresponding single digits of keypad 210 designated as short keys, and a hot key.

Embodiments of this invention use two telephone lines, each originating from a central office. The first telephone line 10 is addressed by a central office using a first telephone number and second telephone line 20 is addressed by the central office using a second telephone number. In addition, the office should be equipped with one facsimile set for the transfer of data and two telephone sets for oral voice communication. One of the two telephone sets may be built in to the facsimile set so that the one telephone set is ordinarily addressed by the same telephone number as the facsimile set. Finally, a subscribing user is typically present to manually control operation of the telecommunications set.

Alternatively to a handset integrated into the facsimile set, a discrete telephone deskset may be substituted for handset 100.

The present invention is particularly useful in a small office where there are two telephone lines, each originating from a central office, one facsimile machine for data transfer, and two telephone sets for voice communication, where one of the telephone sets is integrated into the facsimile machine. Although this telephone set integrated into the facsimile machine may appear to be an added convenience, its use can be inefficient because use of that telephone handset prevents the transmission or reception of facsimile data when the facsimile telephone handset is being used, and the use of the integrated handset discourages a person using that telephone from answering another call on another telephone deskset separately connected to another telephone line somewhere else in the office. Embodiments of invention seek to ameliorate these problems by using switching circuit relays to allow either the facsimile telephone set or the facsimile set itself to be connected to another telephone line. With these improvements, a person, while using the facsimile telephone handset, may either transmit or receive facsimile data while simultaneously carrying on a conversation on the telephone set built into the same facsimile machine, or answer another call on received another telephone line by using the facsimile telephone handset and by placing the earlier call already in progress temporarily on hold by using the facsimile modem and connecting the facsimile telephone handset to the telephone line of the second call.

What is claimed is:

1. A facsimile system having an attached telephone in conjunction with a general telephone for managing multiple incoming calls, said facsimile system comprising:

a first double pole double throw switch having a first pole and a second pole as inputs, a ring terminal and a tip terminal of a first telephone line originating from a central office connected to said first pole and said second pole respectively, said position of said switch being dependent on a first control signal originating from a controller of said facsimile system;

a second double pole double throw switch having a first pole and a second pole as inputs, said second pole connected to a tip terminal of a second telephone line originating from a central office, the position of said switch being dependent on a second control signal originating from said controller of said facsimile system, wherein a first output of said first pole of said first double pole double throw switch is connected to a first output of said first pole of said second double pole double throw switch, a second output of said first pole of said first double pole double throw switch is connected to a second output of said second pole of said second double pole double throw switch, a first output of said second pole of said first double pole double throw switch is connected to a first output of said second pole of said second double pole double throw switch, and a second output of said second pole of said first double pole double throw switch is connected to a second output of said first pole of said second double pole double throw switch;

a single pole single throw switch having a single pole as an input and a single output, said single pole connected to a ring terminal of said second telephone line, said single output connected to said first pole of said second double pole double throw switch, the position of said single pole single throw switch being dependent on a third control signal originating from said controller of said facsimile system;

a first transformer having a primary winding and a secondary winding, said primary winding having a first end and a second end, said first end connected to said second output of said first pole of said first double pole double throw switch, said second end operatively connected to said second output of said second pole of said first double pole double throw switch;

said attached telephone to said facsimile system being connected to both said first output of said first pole of said first double pole double throw switch and said first output of said second pole of said first double pole double throw switch;

a second transformer having a primary winding and a secondary winding, said primary winding having a first end and a second end, said first end connected to said first output of said second pole of said first double pole double throw switch, said second end of said primary winding operatively connected to said first output of said first pole of said first double pole double throw switch;

said secondary winding of said first transformer having a first end and a second end, said first end of said secondary winding being adjacent to said first end of said primary winding of said first transformer, said second end of said secondary winding being adjacent to said second end of said primary winding, said second end of said secondary winding being grounded;

said secondary winding of said second transformer having a first end and a second end, said first end of said secondary winding being adjacent to said first end of said primary winding of said second transformer, said second end of said secondary winding being adjacent to said second end of said primary winding, said second end of said secondary winding being grounded;

a single pole double throw switch having a pole terminal and a first output terminal and a second output terminal, said first output terminal connected to said first end of said secondary winding of said first transformer and said second output terminal of said single pole single throw switch connected to said first end of said secondary winding of said second transformer, said pole of said single pole double throw switch being connected to either said first output terminal or said second output terminal depending on a fourth control signal originating from said controller of said facsimile system;

a first line driver having an input terminal and an output terminal, said output terminal connected to said first end of said secondary winding of said first transformer;

a second line driver having an input terminal and an output terminal, said input terminal connected to said pole of said single pole double throw switch;

a modem having a transmitter terminal and a receiver terminal, said input terminal of said first line driver connected to said transmitter terminal, said output terminal of said second line driver connected to said receiver terminal;

a keypad, allowing for manual input to said controller, and said controller operatively outputting each of said four control signals to control said switches enabling facsimile data to be transmitted and received when said attached telephone to said facsimile system is in use, and allowing one telephone set connected to one of said two telephone lines originating from a central office to intercept other of said two telephone lines originating from said central office.

2. The apparatus of claim 1, when said controller outputs each of said four control signals in response to receiving input signals, comprising:

dual tone multi frequency signals;

hook on/off detection signals from said telephone hand set attached to said facsimile system; and ring detection signals from both said telephone hand set attached to said facsimile system and a general telephone hand set connected to said second telephone line.

3. The facsimile system of claim 2, further comprising:

an encoder that is connected to and outputting signals to an input terminal of said modem, a scanner connected to and outputting signals to said encoder, said scanner receiving signals from said controller, a decoder connected to and receiving output signals from an output terminal of said modem, a printing part connected to and receiving signals from both said decoder and said controller, a buffer part that receives input signals from said general purpose input/output part and outputs said first, second, third, and fourth control signals in response to said input signals received by said controller.

4. The apparatus of claim 2, further comprising:

a first capacitor having a first end and a second end, said first end connected to said second end of said primary winding of said first transformer, said second end connected to said second output of said second pole of said first double pole double throw switch;

an inductor having a first end and a second end, said first end connected to said first end of said primary winding of said first transformer, said second end of said inductor connected to said second end of said first capacitor; and a second capacitor having a first end and a second end, said first end connected to said second end of said primary winding of said second transformer and said second end connected to said first output of said first pole of said first double pole double throw switch.

5. The apparatus of claim 4, when said first line driver comprises:

a first resistor having a first end and a second end, said first end of said first resistor connected to said first end of said secondary winding of said first transformer;

a first amplifier having an input terminal and an output terminal, said output terminal connected to said second end of said first resistor, and said input terminal connected to said transmitter terminal of said modem; and a second resistor having a first end and a second end, said first end connected to said input terminal of said first amplifier and said second end connected to said output terminal of said first amplifier.

6. The apparatus of claim 5, when said second line driver comprises:

a third resistor having a first end and a second end, said first end connected to said pole of said single pole double throw switch;

a second amplifier having an input terminal and an output terminal, said input terminal of said second amplifier being connected to said second end of said third resistor, said output terminal of said second amplifier being connected to said receiver terminal of said modem; and a fourth resistor having a first end and a second end, said first end connected to said input terminal of said second amplifier and said second end connected to said output terminal of said second amplifier.

7. A method of transmitting facsimile data in a facsimile system having an attached telephone handset and connected to a first and a second telephone line, said method comprising the steps of:

while said attached telephone handset on said facsimile system is in use and is connected to said first telephone line, dialing a outside facsimile telephone number from a second telephone handset not combined with said facsimile system and forming a connection between said second telephone handset and an outside facsimile machine on said outside facsimile telephone number over said second telephone line;

receiving a code of dual tone form by said facsimile system indicating that data is to be transmitted from said facsimile system while said attached telephone is in use;

forming an electrical connection between said second telephone line and said facsimile system by switching a set of relay switches in response to said receiving a code of dual tone form by said facsimile system, allowing for data communication between said facsimile system and said outside facsimile machine;

sending and receiving facsimile protocol signals between said facsimile system and said outside facsimile machine at said outside facsimile telephone number over said second telephone line while said attached telephone handset is in use; and transmitting data from said facsimile system to said outside facsimile machine at said outside facsimile telephone number over said second telephone line while said attached telephone handset is in use.

8. A method of accessing a second telephone line originating from a central office while conversing over a first telephone line originating from a central office using a telephone handset built into a facsimile machine, comprising:

engaging in a telephone conversation on said telephone handset built into said facsimile machine over said first telephone line originating from a central office;

receiving a first code of dual tone form from said telephone hand set built into said facsimile machine indicating that access to said second telephone line by said telephone handset built into said facsimile machine is desired;

placing said first telephone line on hold by connecting said first telephone line to a modem of said facsimile system while connecting said second telephone line to said telephone hand set built into said facsimile machine via said switching of said set of relay elements in response to said receiving said first code of dual tone form from by said facsimile machine from said telephone handset built into said facsimile machine;

controlling communications over said second telephone line from said telephone handset built into said facsimile machine while said first telephone line is on hold;

receiving a second code of dual tone form from said telephone hand set built into said facsimile machine indicating the completion of use of said second telephone line;

disconnecting said second telephone line from said telephone handset built into said facsimile machine while restoring connection between said first telephone line and said handset built into said facsimile machine via said relay elements in response to said receiving of said second code of dual tone form by said facsimile machine from said telephone handset built into said facsimile machine; and resuming said telephone conversation over said first telephone line using said handset built into said facsimile machine.

9. A method of accessing a one telephone line originating from a central office while conversing over another telephone line originating from a central office using a single telephone handset having a keypad and a hold button, comprising:

engaging in a telephone conversation on said telephone handset on a first telephone line originating from a central office;

placing said first telephone line on hold by depressing said hold button found on said first telephone handset;

receiving a first code of dual tone form by a facsimile machine from said keypad on said telephone handset, indicating that access to a second and separate telephone line originating from a central office by said telephone handset is desired;

connecting said second telephone line to said telephone hand set via switching a said set of relay elements in response to receipt of said first code of dual tone form from said telephone handset;

controlling communications over said second telephone line from said telephone handset while said first telephone line remains on hold;

receiving a second code of dual tone form from said telephone hand set indicating the completion of use of said second telephone line by said telephone handset;

disconnecting said second telephone line from said telephone handset while restoring connection between said first telephone line and said telephone handset by switching a set of relays in response to receipt of said second code of dual tone form by said facsimile machine; and resuming said telephone conversation over said first telephone line using said telephone handset.

* * * * *